United States Patent [19]

Balgemann et al.

[11] 4,046,108
[45] Sept. 6, 1977

[54] FEEDING DEVICE

[76] Inventors: Dennis Erwin Balgemann; Michael Wong, both of 954 Cookane Ave., Elgin, Ill. 60120

[21] Appl. No.: 657,591

[22] Filed: Feb. 12, 1976

[51] Int. Cl.² ............................................. A01K 5/00
[52] U.S. Cl. ................................................. 119/18
[58] Field of Search ................... 119/18, 51 FS, 52 R, 119/51.5, 51 R

[56] References Cited

U.S. PATENT DOCUMENTS

| | | | |
|---|---|---|---|
| 1,029,660 | 6/1912 | Blanchett | 119/51.5 |
| 1,525,401 | 2/1925 | King | 119/18 |
| 2,532,726 | 12/1950 | Lajoie et al. | 119/52 R |
| 2,699,752 | 1/1955 | Reyes | 119/18 |
| 3,919,977 | 11/1975 | Clark | 119/52 R |

Primary Examiner—G.E. McNeill
Assistant Examiner—Peter K. Skiff

[57] ABSTRACT

The present invention relates generally to dispensers and particularly to a recycling seed and feed dispenser serviceable from the outside of a cage or aviary unit, while dispensing the feed to the interior of the cage and returning the spillage therefrom to a container from which it can later be removed and directly recycled or processed to remove hulls and contaminants.

3 Claims, 19 Drawing Figures

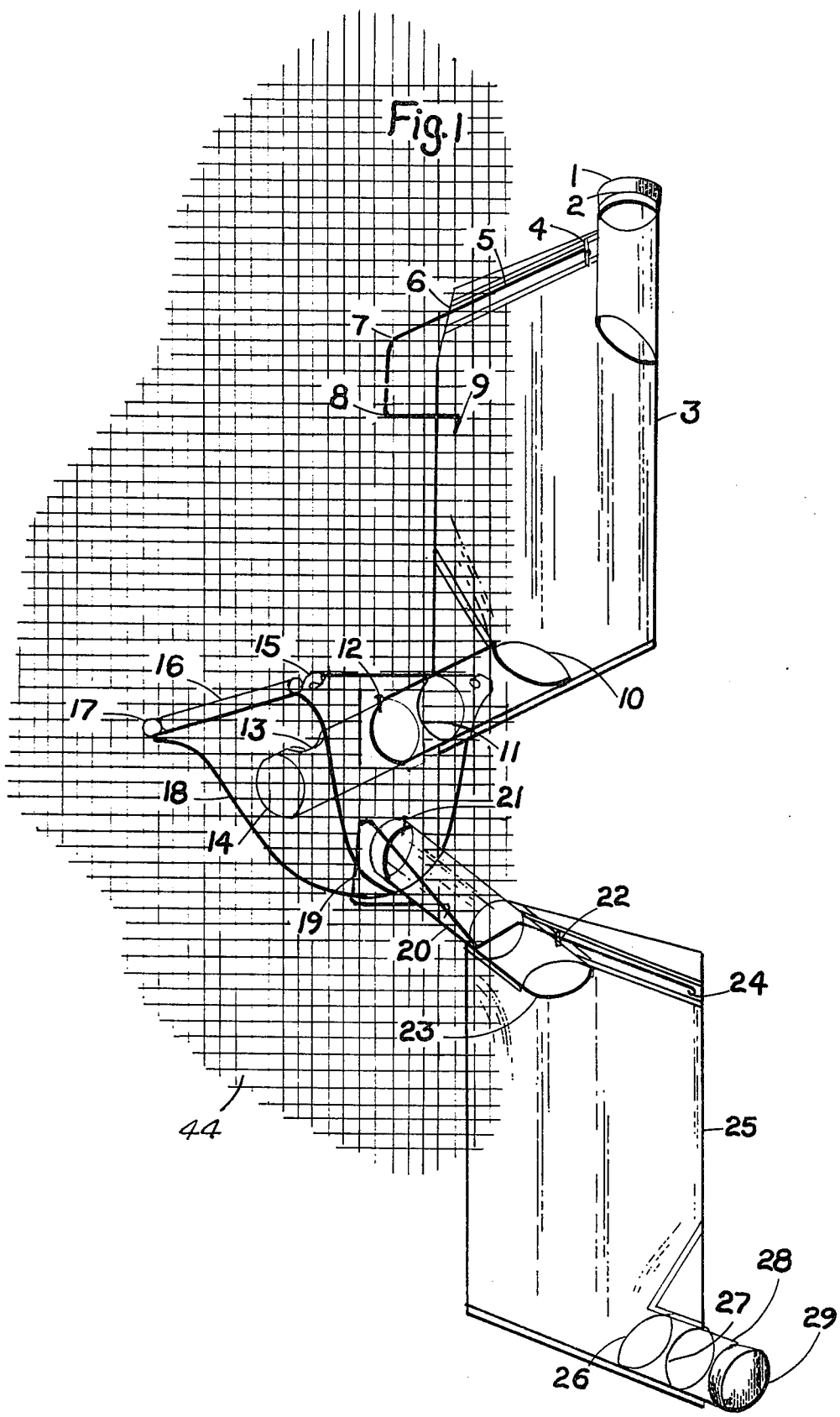

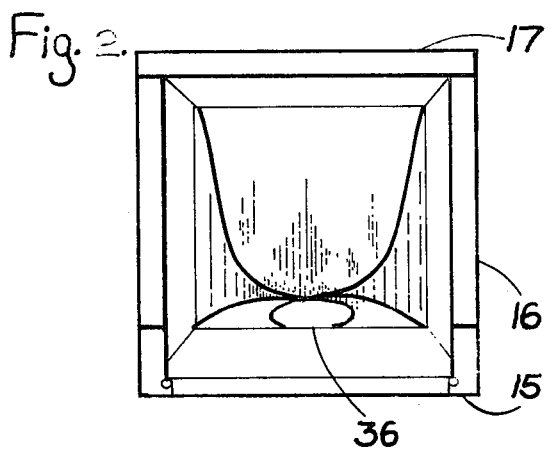
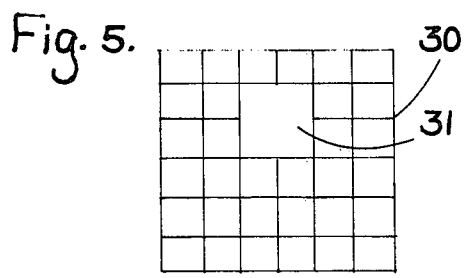
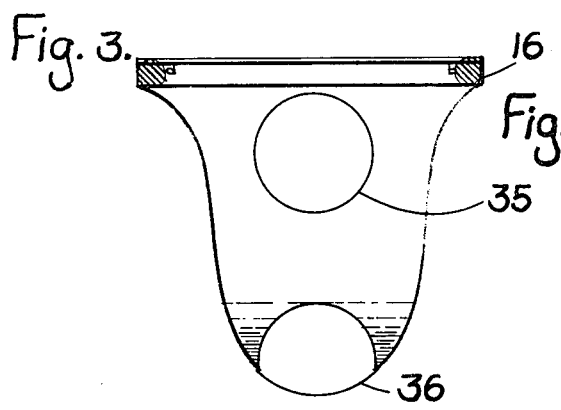
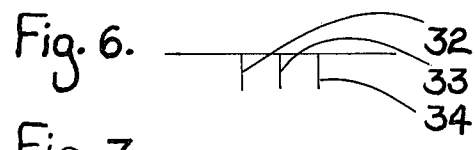
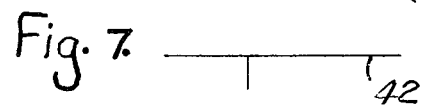
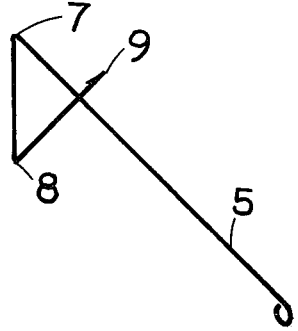
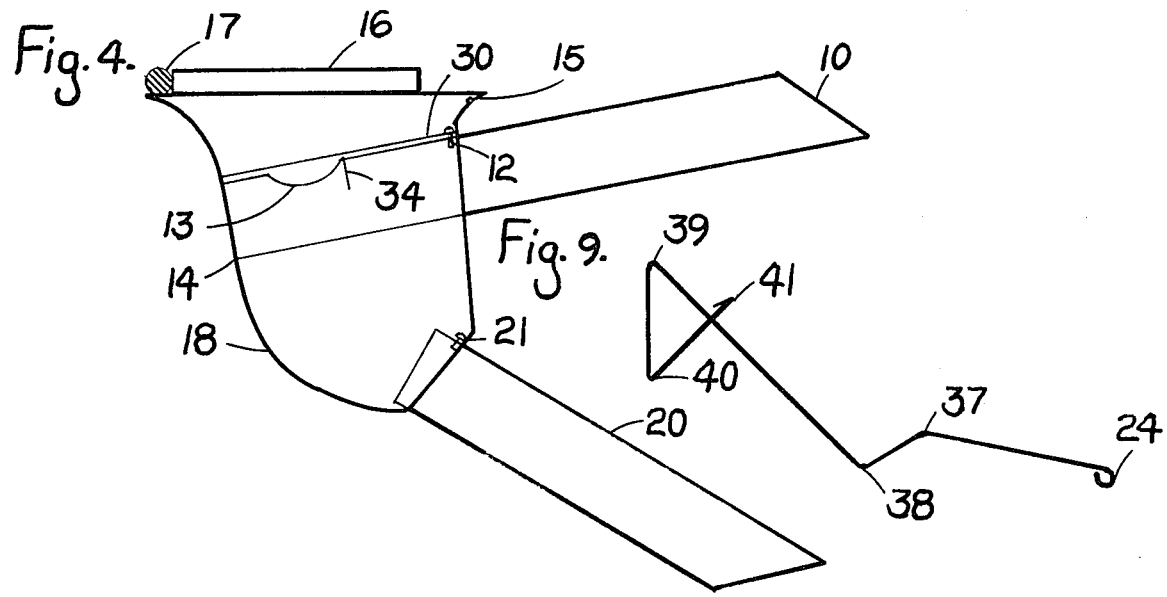

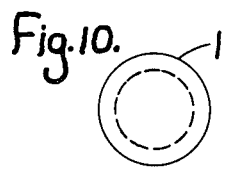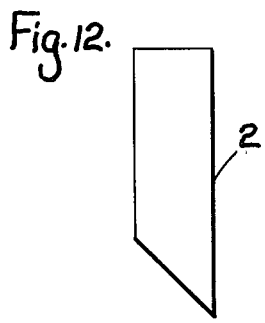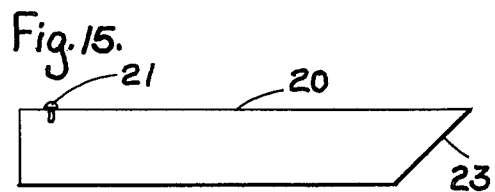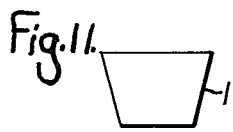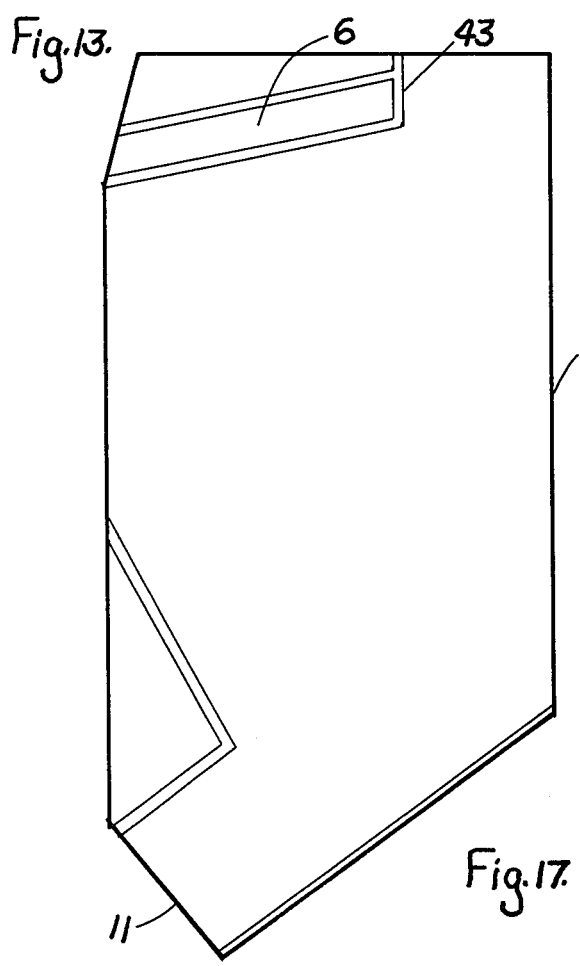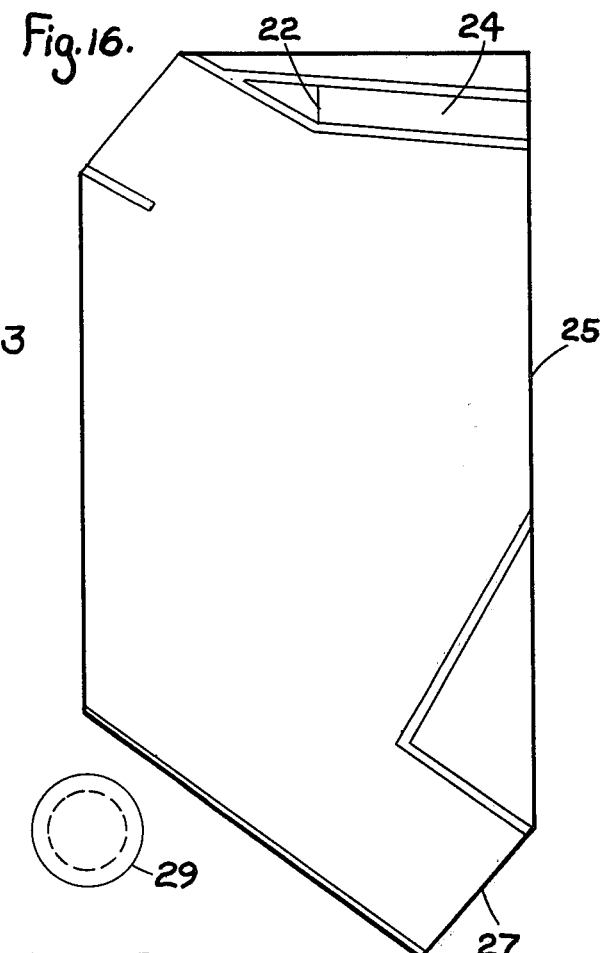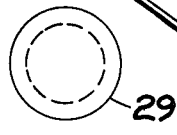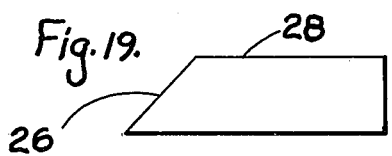

FEEDING DEVICE

Bird cages and aviaries have traditionally been collectors and spreaders of debris from fallen seed husks, uneaten seed, and food particles as supplied by conventional feed dispensing methods and facilities. Consequently, such units have required almost daily cleaning and maintenance to prevent possible health hazards to the birds and the surroundings, and, to minimize the unsightly accumulation of hulled and uneaten seed and feed in the surrounding area. Many birds tend also to waste much of their seed and feed through a thrashing action of their bills while selecting their food, and they thereby cause much waste of such nutrients which are often spilled and contaminated by their feces, dust, moisture, mold and insects.

It is among the primary objectives of the present invention to provide a seed dispenser and recovery system that will prevent the scattering and loss of seed and thereby prevent the contamination of uneaten seeds through the provision of a system of spillage reclamation.

It is also an object of this invention to provide a device which, by virtue of its return of waste by-products and uneaten portions of the seed or feed dispensed, will greatly reduce maintenance time and energy required to service birds (or other animal life for which it may prove to be suited) and thereby enhance the pleasure and profit of keeping and breeding birds.

A further object of this invention is to supply a means for reclaiming otherwise waste seed and feed in a self-collecting and storage system protected from the detrimental effects of exterior moisture, insects, feces, mould and dust, and, to thereby provide a means for its removal and either the direct return of the spillage to the dispenser system or to allow for the recycling of the uneaten portion of the seed through means of its separation other than herein described for patenting purposes, but, which means could include the winnowing out of seed hulls and the return of the whole seeds to the dispenser bag.

Yet another but not limiting object of this invention is to provide a seed dispenser and recovery system that is transparent and thus enables the user to view the exact level and condition of the seed or feed contained therein, and, to also allow for the quick locating of any clogging within the system such as might occur from the placement by a bird of nesting materials over the dispensing aperture, while also hindering the formation of certain bacteria and molds through their exposure to light.

Still another purpose of the invention is to allow for a manual angle adjustment of the dispenser tube as a means of varying the rate at which the contents are released. This adjustability is crucial to the reliability of the dispensers operation, as large and lighter seeds such as sunflower seeds require a steeper angle for proper dispensing than do small more spherical seeds with greater proportionate weight such as found in common budgerigar mixes.

A still further purpose of this invention is to allow, through the auto-mechanical compensation of tension to weight ratio affecting the wire supporting arm of the dispenser bag, for the automatic increase of the dispensing angle as the feed is used up and the dispenser becomes lighter allowing the inherent tension in the wire supporting arm to be thereby constantly lifting the bag and its dispenser tube as its contents diminish.

Another important objective of this invention is to provide an economical unit in costs of materials and production for the benefit of the manufacturer and the consumer through the use of inexpensive and lightweight plastics and simple component systems and methods of installation.

With these and other objects in view, my invention consists in the construction, arrangements and combination of the various parts of my device, whereby the objectives contemplated are attained, as hereinafter more fully set forth, pointed out in my claims and illustrated in the accompanying drawings, wherein:

FIG. 1 is a perspective view of a preferred form of the invention illustrating the overall embodiment of the invention, and, one embodiment of a wire cloth matrix or cage wall to which the unit may be installed.

FIG. 2 is a top elevational view of the return seed chute illustrating the location of perches and of the two notched tabs used in attaching the chute to the cage or aviary wire cloth wall.

FIG. 3 is a front elevational view of the device of FIG. 2 showing the location of the holes for the insertion of the dispenser and return seed chute tubes.

FIG. 4 is a side plan view of the device of FIG. 2 showing the location and angles of the respective tubes and illustrating the placement of the wire matrix safety covering above the seed dispenser tube opening.

FIG. 5 is a top plan view of the wire matrix safety covering showing the location of the rectangular opening through which the bird gains pecking access to the dispensed seed or feed.

FIG. 6 is a front plan view of the device of FIG. 5 showing the three stabilizing wires that are inserted into the seed dispenser tube opening.

FIG. 7 is a side plan view illustrating that the wire matrix safety covering attached to the seed dispenser tube opening nearest the dispenser bag is stabilized by the three stabilizing wires on that side as shown also in FIG. 6.

FIG. 8 is a perspective view of a wire support arm used to suspend the upper dispenser bag and having a series of bends which allow it to be attached to the walls of any of a number of different standard size wire matrix cage or aviary walls.

FIG. 9 is a perspective view of a wire support arm used to suspend the lower collector bag, having means of attachment as described in FIG. 8, while also having an S curve which allows it to bypass the return seed chute.

FIG. 10 and FIG. 11 are top and side plan views respectively of a cork insert for sealing the filling aperture at the top of the dispenser bag. FIG. 12 is a side plan view of the filling tube for the dispenser bag showing the angle at which the tube is cut for its insertion into the aperture of the bag.

FIG. 13 is a side plan view of the overhead dispenser bag illustrating the sleeve for insertion of the wire support arm near the top of the bag and the angle of entry for the dispenser tube as shown by the sleeve at the bottom of the bag.

FIG. 14 is a side plan view of the dispenser tube showing the dorsally located notch cut in the tubing for the feeding process.

FIG. 15 is a side plan view of the seed spil return tube showing the moveable pin system used for fastening the tube to the spill return chute.

FIG. 16 is a side plan view of the collector bag.

FIG. 17 and FIG. 18 are plan views of the cork insert for the emptying tube of the collector bag.

FIG. 19 is a side plan view of the emptying tube inserted in the sleeve at the base of the collector bag when in its operational location.

Referring now in detail to the present preferred embodiment of the invention, illustrated by way of example in the accompanying drawings, the invention provides a set of plastic bag containers situated one above the other as shown in 3 and 25 of FIG. 1. The upper bag 3 is fitted with a corked tube 1 and 2 for filling which tube is fitted into a sleeve in the bag as best shown in FIG. 13 at 11. As illustrated in FIG. 1, it will be seen that the feed dispenser tube 10 is connected to the dispenser bag 3 in the same manner as cited, but the dispenser tube also passes from the base of the dispenser bag through an appropriate opening in the supporting wire matrix wall 44 of FIG. 1 to abut the far end 18 of the spill collector and return chute at 14. The spill collector and return chute attaches to the interior of the wire matrix wall through the use of tabs shown at 15 and has dowel-like perches attached along the leading edges of its front at 17 and side, at 16, faces. Fitted above the spill collector and return chute 18 is a wire matrix guard 30 as illustrated best in FIG. 4. The wire matrix guard prevents the accidental entrance of small birds into either the seed dispensing tube as shown in FIG. 4 at 13 or the area around this dispenser tube. The guard also serves to inhibit the entrance of foreign materials that could cause blockage of the seed dispenser or spill return conduits. The wire matrix guard as shown in FIG. 5 is attached to the dorsal opening 13 of the seed dispenser tube as illustrated in FIG. 4 through the insertion into that opening of three prong extensions as shown in FIG. 6 at 32, 33 and 34 and FIG. 7 at 42, a side view of the three prongs in which they are juxtaposed. They fit in a manner such that the three prongs press tightly against the rim of the dorsal opening at 13 closest to the dispenser tube aperture 35 of the spill collector bin FIG. 3, thus effectively barring the entrance of a small bird through the dispenser tube, while allowing birds access to the seed in the dispenser tube through the pecking aperture in the grid at 31.

To attach the seed dispenser tube 10 to the spill collector and return chute 18 a moveable pin 12 is inserted through a hole at the dorsal and dispenser bag side of the dispenser tube, which pin is depressed into the tube prior to the tubes insertion into the collector bin through the hole provided for same as pictured in FIG. 3 at 35. After the dispenser tube is abutted to side 18 the pin 12 is raised into position whereby it presses against the hole side of the spill collector causing the dispenser tube to fit snugly, but with some flexibility, within the spill collector and return cute walls. A like set pin is located on the spill return tube as illustrated in FIG. 1 on part 23 at 21.

The lower bag as best shown in FIG. 1 at 25 is fitted with a tube for returning the spillage and collecting the spilled materials for later removal through the emptying tube located at 26. This tube is fitted with a cork 29 in the opening 28 to facilitate removal of the contents, and is connected to the collector bag through a slot at 27, but such fittings although described and illustrated herein are not to be construed as limited to soley such means of closure and obviously screw caps and other means of closure could as easily be provided.

My recycling seed dispenser is intended to be attached to any standard size vertical wire mesh wall of suitable area to accommodate the length and breadth of the dispenser and its methods and means for attachment. The means of attachment are through the use of two universal support wire configurations. The upper universal wire supporter arm follows the same method for attachment and of structural configuration for attachment in FIG. 8, between points of bend 7, 8, and 9, as that for the lower universal wire supporter arm as shown in FIG. 9, between points of bend 39, 40 and 41, and may most clearly be described in a position of attachment to a wire matrix wall such as that shown in FIG. 1 at 44 comprised of regular square or rectangular grids, whereby a short bend as in FIG. 1 at 9 thrusts into and abuts the bottom and left edges of a wire grid with its inner axis of bend, while the wire remaining outside that grid bends laterally to the left to 8, then, bends in, with its inner axis of bend abutting the right edge of the grid cited and the wire remaining thus behind that grid, as repeated also at 19 on the lower universal wire supporter arm, bends vertically and about 3° off the vertical and to the right to 7, which is above and behind the vertical wire making up the right edge of the grid sited at 8, thrusting forward and out of the grid at 7 thereafter and extending perpendicular to the plane of the wire cloth grid with the upper universal wire supporter arm ending in a loop as shown in FIG. 9 at 24. The upper universal wire supporter arm fits into the sleeve of the storage bag in FIG. 1 at 3 and is located between the entry slot 6 and the circular bend through which a paper fastener is inserted at 4 which paper fastener prevents the attached storage bag from sliding off its supporter arm. The lower universal wire supporter arm differs structurally from the upper universal wire supporter arm in that after FIG. 9 at 39 which bend is the same as FIG. 8 at 7, it has two additional bends as shown in FIG. 9 at 38 and 37, which bends accommodate the passage of the spill return tube of FIG. 4 at 20, but which then serve to support the lower collector bag 25 through the insertion of the remaining section of wire as shown in FIG. 9 between points of bend 37 and 24, into a sleeve opening on the collector bag as shown in FIG. 16 at 22 and with the use of a circular bend in the wire supporter arm through which another paper fastener may be inserted for further securing the lower universal wire supporter arm to the collector bag as shown in FIG. 9 at 24.

Inasmuch as many changes could be made in the preceeding construction and many apparently widely different embodiments of this invention could be made without departing from the scope thereof, it is intended that all matter contained in the above description or shown in the accompanying drawings shall be illustrative and not in a limiting sense.

It is also to be understood that the language in the following claim is intended to cover all of the generic and specific features of the invention herein described and all statements of the scope of the invention which, as a matter of language, might be said to fall therebetween.

I claim:

1. A feed dispenser, spillage collector and recycling device comprising a storage bag for feed having a upper sleeve and a lower sleeve, a rigid filling tube received in said upper sleeve having a closure on the outer end of said tube, a rigid feed tube received in said lower sleeve extending downwardly from said storage bag, means to support said storage bag from the wall of a cage, a dorsal opening at the lower end of said feed tube for access by a bird to feed located in said feed tube, a stiff collector chute arranged to close the lower end of said feed tube and surround said dorsal opening for catching spillage resulting from a bird removing feed from said opening, said collector chute having means for attachment to a cage wall located on the upper portion of the rear wall of said chute, perches attached to the upper edges of the front and side walls of said chute, a rigid spill return tube attached at an upper end to the lower end of said collector chute, a collector bag having an upper sleeve and a lower sleeve, said upper sleeve receiving the lower end of said spill return tube, said collector bag having a slopped bottom with a rigid emptying tube received in said lower sleeve, means to support said collector bag from the wall of a cage, closure means over the lower end of said emptying tube for periodic removal of the contents therein, thus allowing recycling of the contents, before or after winnowing, and replacement of the useable contents into said upper storage bag.

2. A device as recited in claim 1, which is attachable to a cage or aviary enclosure of wire cloth made up of standard sizes of regular square or rectangular grids and each bag being attached thereto by a removeable wire support arm, so dimensioned that its points of attachment will span from 1/4 to 2 inch wire mesh grids, extending at right angles from the uppermost point of its attachment and which said right angle extension fits into a horizontal or near horizontal sleeve incorporated near the top edges of each of the respective bags and attached thereto at the ends by paper fasteners inserted and through a sleeve of the respective wire support arm, through the circular bend at the end of each such arm and spread apart after emergence from the opposite side of the respective sleeve, and having a slight downward and inward bend at said attachment, thus preventing rotation of the wire support arm in any direction and firmly stabilizing the storage or the collector bag.

3. A device as recited in claim 2, wherein said device further includes a wire matrix safety grid having means for attachment to said dorsal openings, said means consisting of three prongs extending from said wire matrix safety grid at right angles, said prongs inserted into the dorsal opening of the feed dispenser tube in a manner that firmly holds the wire matrix safety grid to the feed dispenser tube, while preventing entry to either said tube or said chute by a small bird or debris larger than the grid dimensions.

* * * * *